United States Patent [19]
Woods

[11] Patent Number: 5,740,670
[45] Date of Patent: Apr. 21, 1998

[54] WATER JACKETED EXHAUST PIPE FOR MARINE EXHAUST SYSTEMS

[76] Inventor: Woodrow Woods, 3640 Fiscal Ct., Riviera Beach, Fla. 33404

[21] Appl. No.: 580,548

[22] Filed: Dec. 29, 1995

Related U.S. Application Data

[63] Continuation-in-part of Ser. No. 419,097, Apr. 10, 1995, abandoned.

[51] Int. Cl.$^6$ ............................................. F01N 3/04
[52] U.S. Cl. ........................................ 60/310; 440/89
[58] Field of Search ............................ 60/310; 440/89

[56] References Cited

U.S. PATENT DOCUMENTS

| | | | |
|---|---|---|---|
| 793,886 | 7/1905 | Low | 60/310 |
| 799,013 | 9/1905 | Moffitt | 60/310 |
| 3,209,534 | 10/1965 | Stallman | 60/310 |
| 5,212,949 | 5/1993 | Shiozawa | 60/310 |

*Primary Examiner*—Douglas Hart
*Attorney, Agent, or Firm*—Malin, Haley, DiMaggio & Crosby, P.A.

[57] ABSTRACT

A water jacketed exhaust pipe comprising an inner liner, an outer shell, and a spray ring. The inner liner includes an internally tapered section which clips the turbulence that occurs along the inner walls of the liner. As a result, fluid expelled from the spray ring will not migrate into the inner liner where it can cause severe corrosion. The inner liner is longer than the outer shell. The outer liner includes an internally tapered section which scatters the stream of water expelled from the spray ring and further redirects water onto the inner liner and into the center of the exhaust path. The redirected water particles are easily vaporized and in the process, extract a significant amount of heat from the exhaust system.

14 Claims, 5 Drawing Sheets

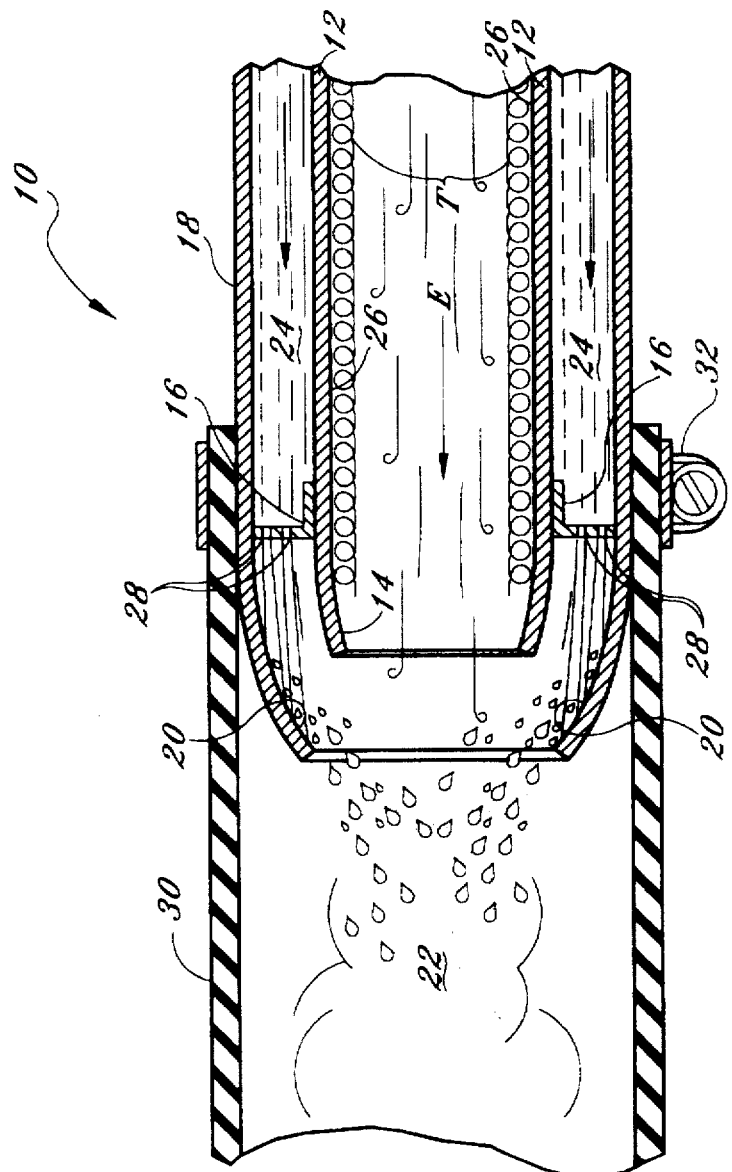
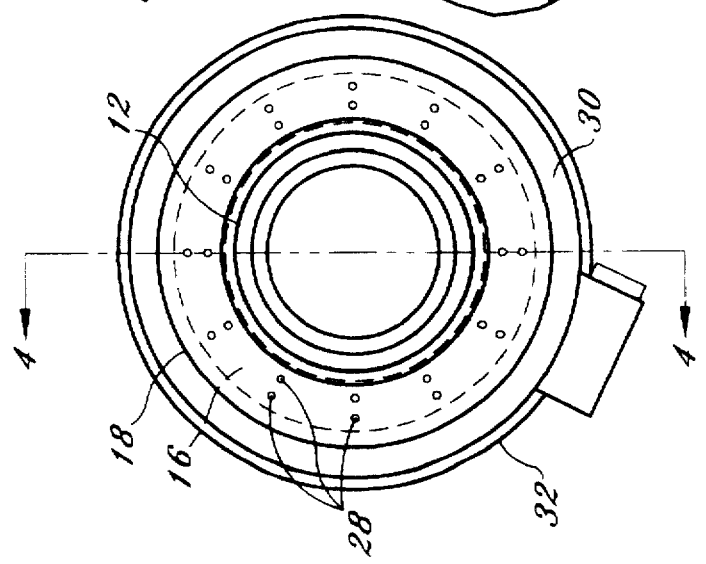
Fig. 4
Fig. 3

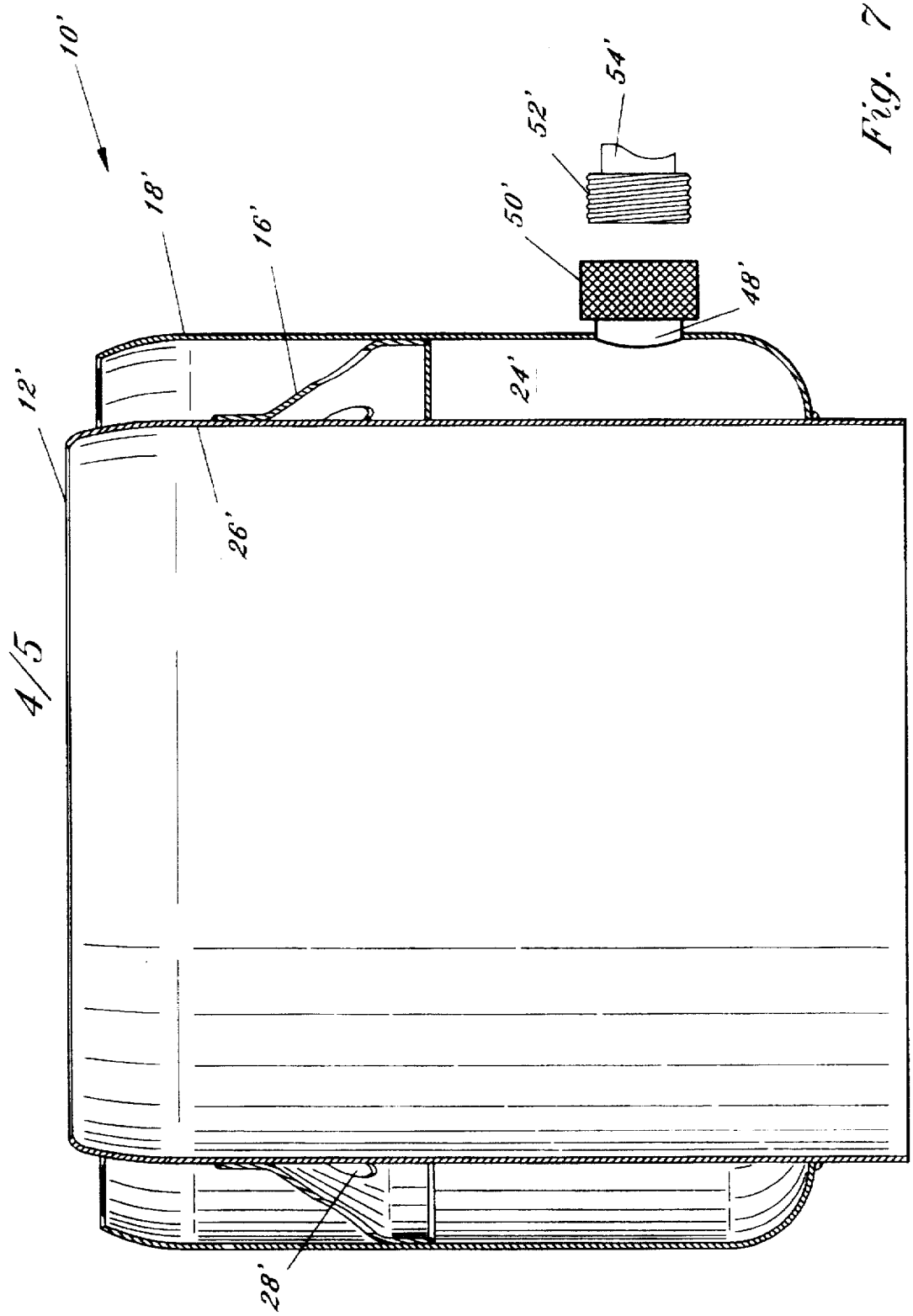

WATER JACKETED EXHAUST PIPE FOR MARINE EXHAUST SYSTEMS

This is a continuation-in-part of application Ser. No. 08/419,097, filed Apr. 10, 1995, and now abandoned.

BACKGROUND OF THE INVENTION

1. Field of the Invention

The present invention relates generally to a water jacketed exhaust pipe that curtails surface exhaust turbulence near the tail end of an inner liner of the pipe thereby preventing the migration of potentially corrosive water and salt back into the inner liner of the pipe. Additionally, the present invention scatters a stream of water exiting the water jacketed exhaust pipe into a spray which is directed into the exhaust gas path thereby causing superior heat exchange from the coolant to the exhaust gas.

2. Description of the Prior Art

Typically marine engines are cooled by water which is pumped from the ocean or lake through a cooler into the engine and then discharged therefrom into a water jacketed exhaust pipe to cool the exhaust system. Preferably, the exhaust is cooled as far upstream as possible to reduce thermal stress on the downstream exhaust system components. However, the prior art method of cooling the exhaust system by injecting a stream of water into the exhaust stream is crude and inefficient. As shown in FIG. 1, the typical arrangement employs a water jacketed exhaust pipe 2 comprising an outer shell 4, an inner liner 6 and a spray ring 8. The pipe 2 is connected to a heat resistant rubber hose or some other standard exhaust conduit. Near the termination of exhaust pipe 2 a circumferential spray ring 8 is employed between the inner liner 6 and outer shell 4. The spray ring 8 is essentially a washer or partition that separates outer shell 4 from inner liner 6 and impedes water from freely exiting the water jacket volume 5 formed between the outer shell and the inner liner. Generally, spray ring 8 contains a plurality of narrow longitudinal passageways 9 from which coolant can exit volume 5 in the form of a spray or stream. However, the coolant stream exiting water jacket volume 5 is generally streamed along only the outer circumference of the volume of exhaust gas flow as shown in FIG. 1. Accordingly, there is a poor mixture of coolant and exhaust gas and thus poor heat exchange. Subsequently, the exhaust system components downstream of the tail end of the water jacketed exhaust pipe 2 unnecessarily absorb heat that could better be transferred to the water. As a result, these downstream components are subjected to higher temperatures and greater temperature cycling than necessary. Moreover, in light of the production of larger marine engines which run at hotter temperatures, marine exhaust systems are already being subjected to hotter temperatures. Accordingly, there is a need for more efficient ways of cooling a marine exhaust system.

An additional shortcoming of the prior art is corrosion. Specifically, it has been discovered that due to the direction of the exhaust gas flow within inner liner 6 a narrow band of turbulence is created near its inner surface 3. As shown in FIG. 2, turbulence T as a suctioning effect opposite the direction of exhaust gas flow. Accordingly, some of the water exiting spray ring 8 will slowly migrate into inner liner 6 along inner surface 3. Additionally, when the boat is run in the ocean the cooling water will contain salt and other impurities that will also migrate into the inner liner. Unfortunately, the hot exhaust gases which contain hydrogen-sulfide and carbon molecules chemically react with the chloride ions produced from the heated salt water to form acids including a mild sulfuric acid which are deposited on the inner surface of liner 6. These acids, over a short period of time corrode the water jacketed exhaust pipe 2. Presently, the only way to prevent this corrosion is to manufacture the inner liner of a highly expensive material that is resistant to acid corrosion.

Accordingly there is a present need for a improved water jacketed exhaust pipe that provides a superior mixture of coolant and exhaust gas and consequently has better heat exchange characteristics. Additionally, there is a present need for a jacketed exhaust pipe termination which clips the turbulence along the inner surface of the inner liner and thereby prevents water spray from migrating into the inner liner where corrosion can occur.

SUMMARY OF THE INVENTION

The water jacketed exhaust pipe termination of the present invention solves the problems encountered by the prior art by the provision of both a first inwardly directed section at the tail end of the inner liner and a second inwardly directed taper at the tail end of the outer shell of the water jacketed exhaust pipe. The first inwardly directed section of the inner liner clips the surface turbulence near the tail end of the inner surface of the inner liner. The second inwardly directed taper near the tail end the outer shell forms a deflection surface which breaks up the water stream and in turn increases heat exchange. Consequently, two significant shortcomings of the prior art have been eliminated without significantly increasing the cost of the pipe.

The first shortcoming eliminated by the present invention is corrosion. Specifically, the first inwardly directed section of the inner liner forms a turbulence barrier that prevents the formation of turbulence near the tail end of the inner surface of the inner liner. In turn, this prevents water and salt from migrating upstream into the inner line and chemically reacting therein to form acids that are deposited on the inner surface of the inner liner. As a result, the prior art shortcoming of destructive acid deposits that corrode the inner line has been eliminated.

The second significant shortcoming eliminated by the present invention is poor heat exchange. The second inwardly directed taper near the tail end of the outer shell forms a deflection surface for water exiting the spray ring. As such, the spray or stream exiting from the spray ring collides with the inner surface of the inwardly directed taper and is broken down into fine water particles which are deflected into the path of exhaust gas flow. Since the water particles have a much greater surface area than the stream of water ejected from the spray ring and since the particles are deflected directly into the exhaust gas path, the cooling water absorbs far more thermal energy per unit volume than the prior art designs.

Accordingly, the new termination makes the muffler pipe more corrosion resistant and increases the surface area of the water that is forced into the exhaust gas path. In turn, this increases the cooling efficiency of the muffler and provides superior thermal protection to the exhaust system components downstream from the water jacketed pipe termination.

It is therefore a principal object of this invention to provide a water jacketed exhaust pipe termination that breaks the stream of water exiting the water jacket into a spray of variably sized water particles.

It is a further object of this invention to provide a water jacketed exhaust pipe termination that clips surface turbulence along its inner liner.

It is yet another object of this invention to provide a water jacketed exhaust pipe termination that prevents water spray from migrating upstream into the inner liner of the water jacketed exhaust pipe.

It is still another object of this invention to provide a water jacketed exhaust termination that prevents corrosion of the inner liner.

It is still yet another object of this invention to provide a water jacketed exhaust pipe that resists acid corrosion without the use of highly expensive acid resistant materials.

It is an additional object of this invention to provide a more efficient water jacketed exhaust conduit that reduces thermal fatigue to exhaust system components downstream of the water jacketed exhaust pipe.

In accordance with these and other objects which will become apparent hereinafter, the instant invention will now be described with particular reference to the accompanying drawings.

BRIEF DESCRIPTION OF THE DRAWINGS

FIG. 3 is a end view of the present invention; and

FIG. 4 is a side sectional view of the present invention.

FIG. 7 is a side sectional view showing an alternate embodiment of the present invention.

DESCRIPTION OF THE PREFERRED EMBODIMENTS

Figures 1, 2:
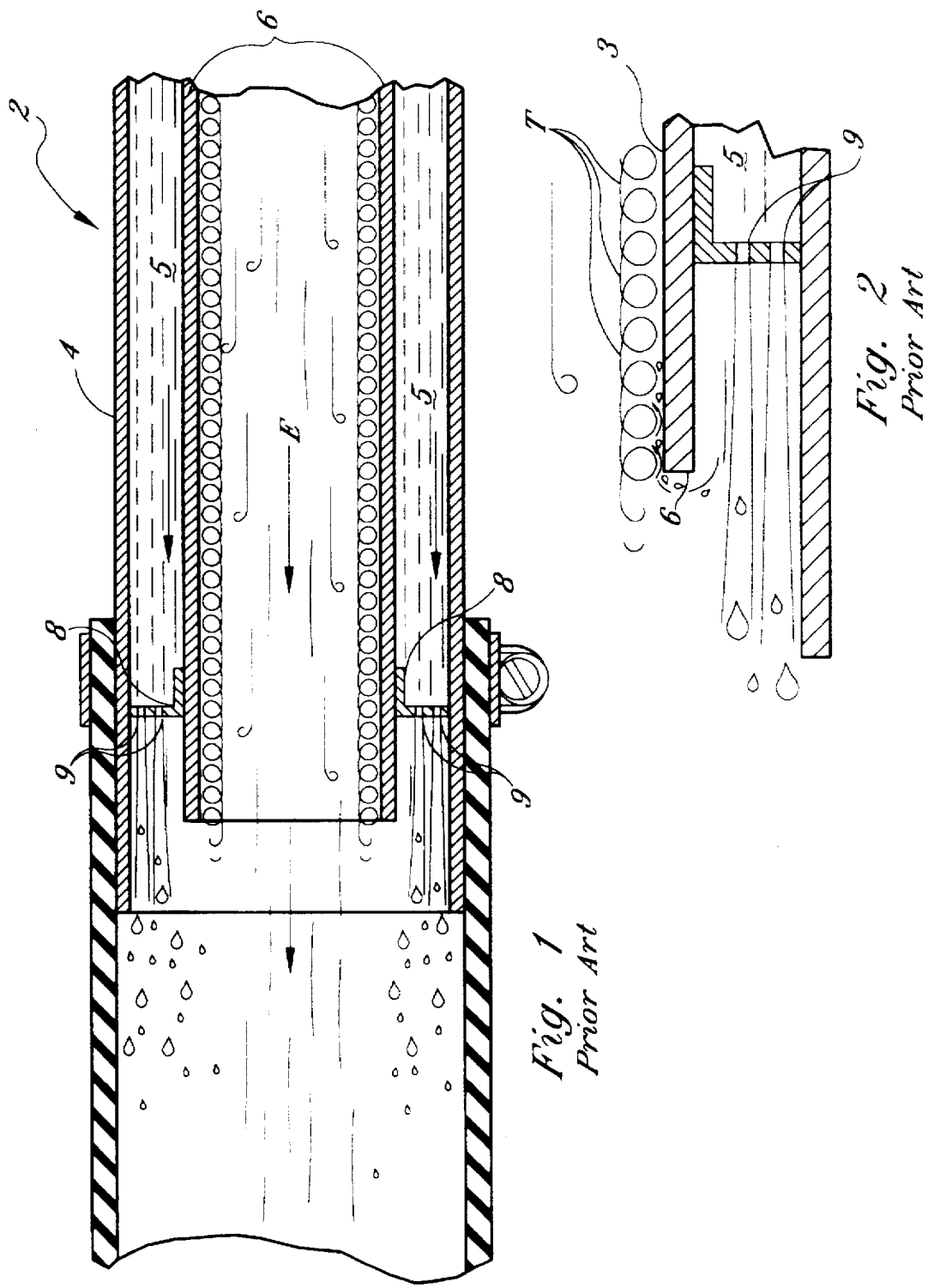
FIG. 1 is a side section view of the prior art.
FIG. 2 is a detailed view of the tail end of the inner and outer liners of FIG. 1.
Figure 5:
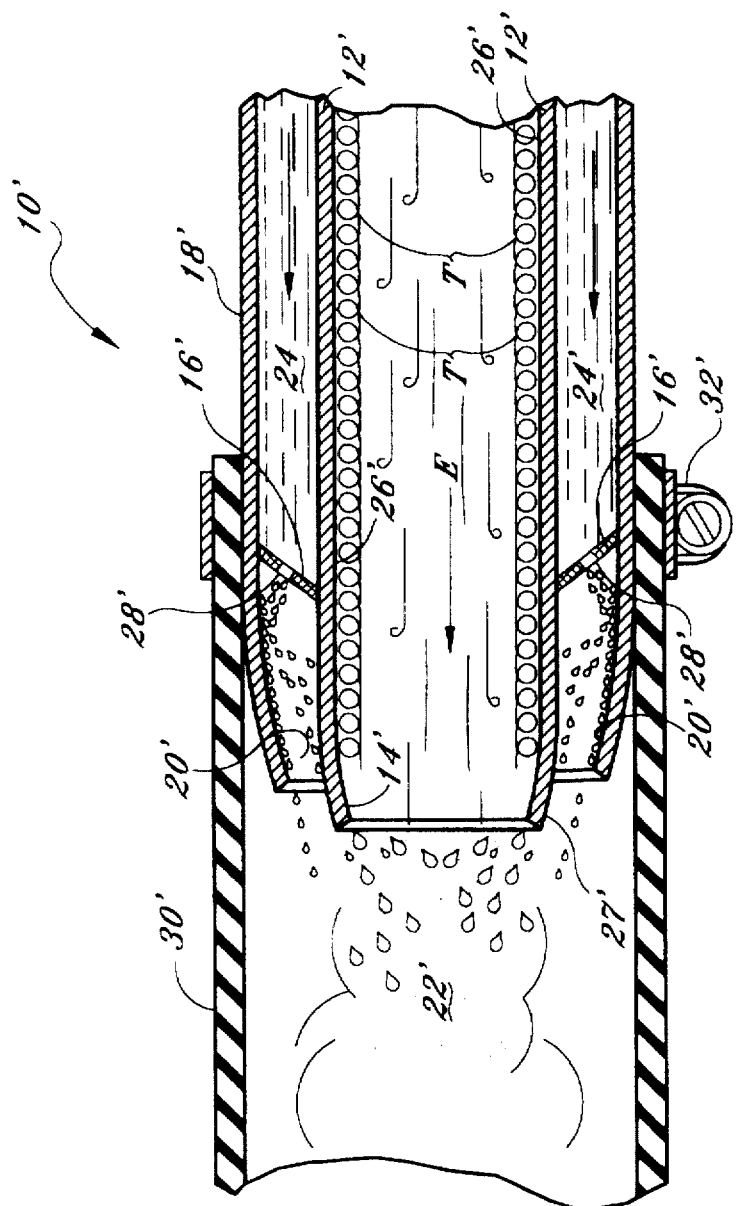
FIG. 5 is a side sectional view of an alternate embodiment of the present invention.
Figure 6:
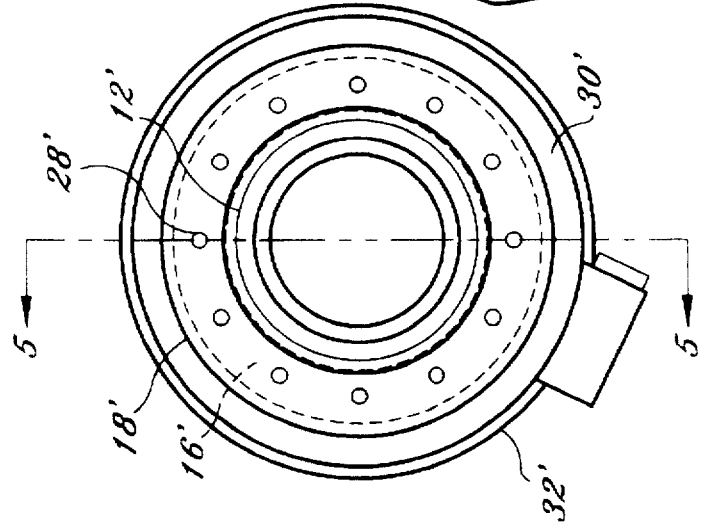
FIG. 6 is an end view of an alternate embodiment of the present invention.

With reference to FIG. 4, there is depicted a water jacketed exhaust pipe generally characterized by reference numeral 10. The exhaust pipe 10 generally comprises an inner liner 12 having a first inwardly tapered surface 14, an outer shell 18 having an inwardly tapered surface 20 at tail end 16 and a spray ring 16.

In the preferred embodiment both the inner liner 12 and the outer shell 18 and spray ring 16 are constructed from corrosion resistant metal such as stainless steel for example. The outer shell 18 is generally cylindrical in shape and has a diameter greater than inner liner 12. Between outer shell 18 and inner liner 12 is a spray ring 16 or spacer that separates the outer shell from the inner liner, forming a water jacket volume 24 therebetween. Additionally, spray ring 16 prevents water contained in volume 24 from freely exiting the exhaust pipe 10. Preferably, spray ring 16 contains several narrow longitudinal passageways 28 that allow water to pass from volume 24 to cooling turbulent area 22. In that manner, a back pressure is built up within volume 24 thereby forcefully ejecting water through the longitudinal passageways 28 to cooling turbulent area 22. Although the passageways shown are parallel to the elongate axis of the pipe, it is realized they may be in any direction so long as they fluidly connect volume 24 with an external volume outside the exhaust pipe 10.

In operation the exhaust gas flow shown as E in FIG. 4 is directed toward the left out of the water jacketed exhaust pipe 10. As shown, the exiting exhaust gas E causes turbulence T near the inner surface 26 of inner liner 12. Typically, turbulence T is contained within fractions of an inch from inner surface 26. As a result, the turbulence produces a suction effect that normally tends to attract water ejected from passageways 28 of spray ring 16 onto inner surface 26 of the inner liner. However, as shown in FIG. 4, the first inwardly tapered surface 14 at the tail end of inner liner 12 clips the turbulence and as a result inhibits water from travelling backwards along inner surface 26 of the liner.

An additional advantage of the preferred embodiment is its superior heat exchange properties. Specifically, outer shell 18 is provided with a second inwardly tapered surface 20 at its tail end. Preferably, the second inwardly tapered surface 20 is curved such that over its length it curves almost to the radius of inner liner 12. As a result, second inwardly tapered surface 20 is directly in the path of the water stream ejected through the passageway 28 of the spray ring. Accordingly, as the water exits spray ring 16 it forcefully collides into the second inwardly tapered surface 20 and is broken up/separated into fine water particles. As can be seen in FIG. 4, the water particles have a much greater surface area than did the stream of water exiting spray ring 16. Furthermore, the particles upon colliding with surface 20 are redirected into the central part of the exhaust gas flow shown as turbulent cooling area 22. While in the turbulent cooling area the fine water particles are almost immediately converted into steam thereby taking on an immense amount of kinetic and thermal energy. The energy exchange taking place is immense when compared to the amount of energy absorbed by the prior art designs because a phase change takes place. Specifically, since the fine water particles have a much greater surface area as compared with a stream of water they can better mix with the exhaust gases in cooling area 22 and take on enough kinetic and thermal energy to convert from a liquid phase to a gaseous phase. Consequently, a great deal more energy is removed from the exhaust gas than in prior art designs. In turn, this gas is quickly carried through the remaining downstream sections of the exhaust pipe and expelled from the exhaust system. As a result, the downstream exhaust system components which may be fiberglass or rubber are subjected to significantly less thermal stress and are thus are far less prone to melting or other forms of fatigue that could ultimately end in their failure. For example, as shown in FIG. 2 the tail end of the water jacketed exhaust pipe is connected to a heat resistant silicone based rubber hose 30 via a hose clamp 32. Although hose 30 is normally resistant to high temperatures it has a longer life expectancy when subjected to lower temperatures. Accordingly, another advantage of the present invention is reduced thermal fatigue on exhaust system components downstream from the tail end of the water jacketed exhaust pipe 10.

It is realized that neither the first or second inwardly tapered surfaces 14 and 20, respectively, have to be curved as shown in FIG. 2. Rather, either or both surfaces may be in the form of a cone or any other shape that is generally directed inwardly. Furthermore, the use of the term water in this application is meant to include sea water, lake water and in general any body of water that marine vessels may be operated within.

An additional shortcoming of the prior art is eliminated due to the superior heat exchange properties of the present invention. Typically, a marine engine of an average size boat will pump 90–100 gallons per minute when running at full bore or cruising speed. Accordingly, there is a great deal of water to cool both the engine and exhaust system when the engine is running at this speed. However, when the engine is idling, it is typical that only 15 gallons per minute will be pumped through the exhaust system. In the prior art designs, 15 gallons per minute does not extract a great deal of heat from the exhaust and thus, the exhaust system can be overheated. However, in the present invention, adequate cooling still takes place, even when the engine is running at idle and only pumping 15 gallons of water per minute due to the higher efficiency of heat transfer from the exhaust gas E to the water.

It is envisioned that this invention is applicable to both water jacketed pipe and dry pipe. Water jacketed pipe refers to a type of pipe wherein the entire pipe is double-walled from the engine to the tail end and water is communicated from the engine directly into the space between the inner liner and outer shell. On the other hand, a dry pipe is a single-walled pipe wrapped with insulation, wherein only a short section at the very tail end of the pipe contains a double-walled section. In this case, a water can is welded onto the dry pipe and water can be pumped into the tail end of the pipe to be mixed with exhaust in the same manner explained for the water jacketed pipe.

ALTERNATE EMBODIMENT

In an alternate embodiment, as shown in FIGS. 5–9, the inner liner 12' extends beyond the outer shell 18'. Spray ring 16' is angled between outer shell 18' and inner liner 12' so that passageways 28' direct water flow from volume 24' onto inner surface 20' of outer shell 18'.

Directing the water flow from passageways 28' directly at the outer shell 18' intensifies the effect of the inwardly tapered surface 20'. The water fans out from passageways 28' and collides with outer shell 18' and inwardly tapered surface 20' and is further broken up/separated into fine water particles. A portion of the water particles are deflected back onto the exterior surface 27' of the inner liner 12' thereby providing a uniform film of water near the termination of the exterior surface 27' of inner liner 12'. The uniform film of water absorbs heat from inner liner 12', and under certain operating conditions will almost instantaneously flash to steam thereby beginning the cooling process even prior to entering the turbulent cooling area 22'.

Passageways 28' in spray ring 16', shown in FIGS. 5–8, are fewer, but larger in diameter than passageways 28 in spray ring 16, shown in FIG. 4. Fewer large diameter passageways increases water flow and the cooling effect is thereby increased. Passageways 28' are spaced such that the streams of water fan out therefrom such that streams from adjacent passageways 28' intersect after contacting outer shell 18' thereby causing a portion of the water to deflect away from outer shell 18' and onto the outer surface 27' of inner liner 12'. Accordingly, it is important that spray ring 16' is spaced a sufficient distance from the termination of the inner liner 12' and outer shell 18', and that passageways 28' are spaced and angled toward outer shell 18' so as to project fanning streams of water such that adjacent streams intersect after contacting outer shell 18' causing a portion of each water stream deflect onto the outer surface 27' of inner liner 12'. In addition, a portion of the water disperses into a substantially uniform film on the inner surface of outer shell 18' and is dispersed as fine particles by inwardly tapered surface 20' into the central part of the exhaust gas flow 22'

Inner liner 12' extends beyond the end of outer shell 18' into the turbulent cooling area 22'. As in the first embodiment, the inwardly tapered surface 14' of inner liner 12' clips turbulence and thus inhibits water from traveling backward along inner surface 26' of liner 12'. Having inner liner 12' extend into the turbulent cooling area 22', further reduces water flow back along inner surface 26' of the liner.

Figure 9:
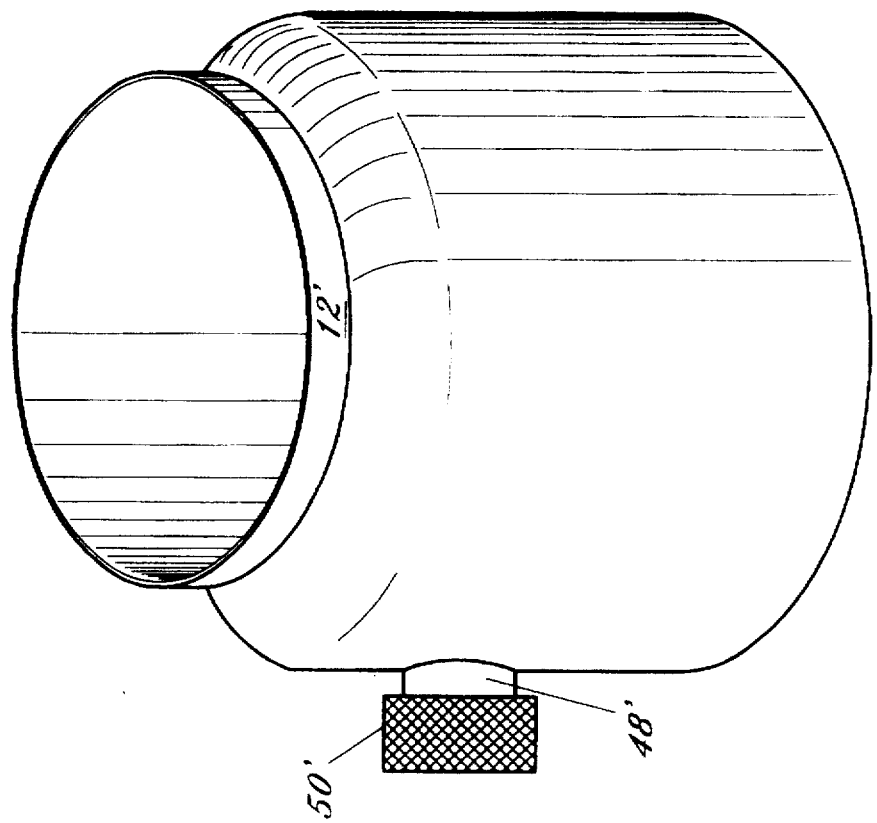
FIG. 9 is a perspective view of the exhaust inlet end of the alternate embodiment shown in FIG. 7.
Figure 8:
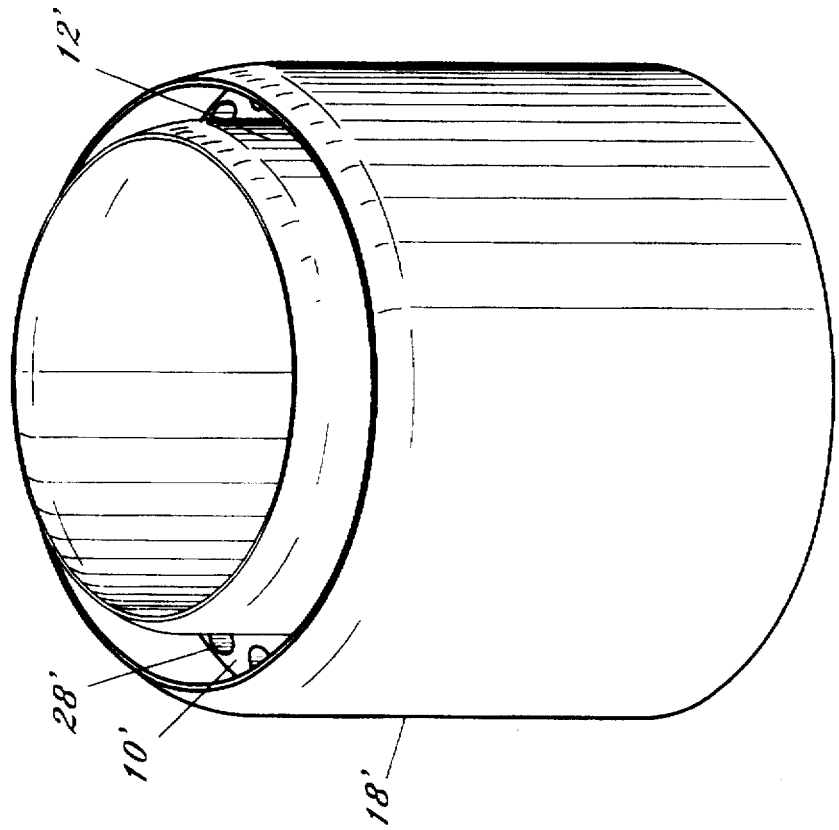
FIG. 8 is a perspective view of the exhaust exit end of the alternate embodiment shown in FIG. 7.

In an example of supplying water to the present invention, as shown in FIGS. 7–9, water will enter volume 24' via fitting 50' and inlet pipe 48'. Fitting 50' will attach via fitting 52' to water pipe 54'. Water entry in this manner is intended as an example and is not intended to restrict the invention only this manner of water entry.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A water jacketed exhaust pipe for marine engines comprising:

an elongated inner liner, said liner having a tail end, said tail end defining a first inwardly tapered section;

an elongated outer shell, said shell surrounding said liner about an elongate axis of said pipe, said shell further having a tail end, said shell tail end defining a second inwardly tapered section;

said elongated inner liner extends axially beyond said tail end of said elongated outer shell;

a spacer disposed between said outer shell and said inner liner for separating said shell from said liner at to define a volume therebetween, said spacer further defining at least one passageway there through communicating said volume with a second volume outside said exhaust pipe.

2. The water jacketed exhaust pipe for marine engines as in claim 1, wherein a portion of water exiting said at least one passageway is deflected onto said inner liner.

3. The water jacketed exhaust pipe for marine engines as in claim 1, wherein said spacer is a ring.

4. The water jacketed exhaust pipe as set forth in claim 1, wherein said inner liner and said outer shell are substantially cylindrical.

5. The water jacketed exhaust pipe as set forth in claim 1, wherein said inner liner, said outer shell and said spacer are constructed from a corrosion resistant material.

6. The water jacketed exhaust pipe as set forth in claim 1, wherein said inner liner, said outer shell, and said spacer are constructed of stainless steel.

7. The water jacketed exhaust pipe as set forth in claim 1, wherein said first and second inwardly tapered sections are cone shaped.

8. The water jacketed exhaust pipe as set forth in claim 1, wherein at least one of said first and second inwardly tapered sections is curved.

9. A water jacketed exhaust pipe for marine engines comprising:

an elongated inner liner, said liner having a tail end, said tail end defining an inwardly tapered section;

an elongated outer shell having a tail end, said shell surrounding said liner about an elongate axis of said pipe;

said elongated inner liner being extended axially beyond said tail end of said elongated outer shell;

a spacer angularly disposed between said outer shell and said inner liner and separating said shell from said liner and defining a volume therebetween, said spacer further defining at least one passageway thereby fluidly communicating said volume with a second volume outside said exhaust pipe; and, wherein fluid from said first volume is directed toward said outer shell by said at least one passageway.

10. The water jacketed exhaust pipe for marine engines as in claim 9, wherein said spacer is a ring.

11. The water jacketed exhaust pipe as set forth in claim 9, wherein said inner liner, said outer shell, and said ring are constructed from a corrosion resistant material.

12. The water jacketed exhaust pipe as set forth in claim 9, wherein said inwardly tapered section is curved.

13. A water jacketed exhaust pipe for marine engines comprising:

an elongated inner liner;

an elongated outer shell, said shell surrounding said liner about an elongate axis of said pipe, said shell further defining a tail end, said tail end defining an inwardly tapered section;

said elongated inner liner being extended axially beyond said tail end of said elongated outer shell;

a spacer angularly disposed between said outer shell and said inner liner and separating said shell from said liner and defining a volume therebetween, said spacer further defining at least one passageway thereby communicating said volume with a second volume outside said exhaust pipe; and, wherein fluid from said first volume is directed toward said outer shell by said at least one passageway.

14. The water jacketed exhaust-pipe for marine engines as in claim 13, wherein said spacer is a ring.

* * * * *